United States Patent
Liu et al.

(10) Patent No.: US 11,265,840 B2
(45) Date of Patent: Mar. 1, 2022

(54) DATA TRANSMISSION AND MANAGEMENT FOR POSITIONING MOBILE DEVICES

(71) Applicant: ZTE Corporation, Guangdong (CN)

(72) Inventors: Xu Liu, Guangdong (CN); Bo Dai, Guangdong (CN); Xiubin Sha, Guangdong (CN); Ting Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/968,552

(22) PCT Filed: Feb. 9, 2018

(86) PCT No.: PCT/CN2018/075913
§ 371 (c)(1),
(2) Date: Aug. 7, 2020

(87) PCT Pub. No.: WO2019/153215
PCT Pub. Date: Aug. 15, 2019

(65) Prior Publication Data
US 2021/0045083 A1  Feb. 11, 2021

(51) Int. Cl.
*H04W 64/00* (2009.01)
*H04W 68/00* (2009.01)

(52) U.S. Cl.
CPC .......... *H04W 64/00* (2013.01); *H04W 68/00* (2013.01)

(58) Field of Classification Search
CPC .............................. H04W 64/00; H04W 68/00
USPC ...................................................... 455/456.1
See application file for complete search history.

(56) References Cited

U.S. PATENT DOCUMENTS

| | | | |
|---|---|---|---|
| 2002/0072369 A1* | 6/2002 | Sasada | H04W 60/04 455/435.2 |
| 2010/0041418 A1 | 2/2010 | Edge et al. | |
| 2011/0053613 A1 | 3/2011 | Zhou et al. | |
| (Continued) | | | |

FOREIGN PATENT DOCUMENTS

| | | | |
|---|---|---|---|
| CN | 101426262 A | 5/2009 | |
| CN | 101686540 A | 3/2010 | |
| (Continued) | | | |

OTHER PUBLICATIONS

International Search Report and Written Opinion dated Nov. 6, 2018 for International Application No. PCT/CN2018/075913, filed on Feb. 9, 2018 (7 pages).

(Continued)

*Primary Examiner* — Ted M Wang
(74) *Attorney, Agent, or Firm* — Perkins Coie LLP

(57) ABSTRACT

Methods, systems, and devices related to data transmission and management for positioning User Equipment (UE) in a network are described. In one representative aspect, a method for wireless communication includes receiving, at a wireless communication node, a first paging message from a network node, wherein the first paging message includes information that facilitate positioning a mobile device in a wireless network. The method also includes transmitting, from the wireless communication node, a second paging message to the mobile device, wherein the second paging message includes the information that facilitate positioning the mobile device in the first paging message.

8 Claims, 13 Drawing Sheets

(56) References Cited

U.S. PATENT DOCUMENTS

2013/0029697 A1* 1/2013 Jung .................... H04W 68/00
455/458
2018/0035470 A1 2/2018 Chen et al.

FOREIGN PATENT DOCUMENTS

CN 101730223 A 6/2010
WO 2009129844 A1 10/2009

OTHER PUBLICATIONS

Examination Report for Australian Patent Application No. 2018407202, dated Feb. 23, 2021 (5 pages).
Qualcomm Europe, "Miscellaneous updates to TS 36.305," 3GPP TSG-RAN WG2 #66bis, Los Angeles, California, R2-093861, Jun. 2009.
Office Action for Chinese Patent Application No. 201880084968.3, dated Mar. 26, 2021.
Examination Report for Australian Patent Application No. 2018407202, dated Nov. 19, 2021 (9 pages).
LG Electronics, "Data transmission during random access procedure in MTC," 3GPP TSG RAN WG1 Meeting #88bis, Spokane, USA, R1-1704846, Apr. 2017 (5 pages).
Qualcomm Incorporated, "Early data transmission," 3GPP TSG RAN WG1 Meeting #90, Prague, Czechia, R1-1712804, Aug. 2017 (17 pages).
Kyocera, "Details of Early data transmission for eFeMTC," 3GPP TSG-RAN WG2 #99bis, Prague, Czech Republic, R2-1710791, Oct. 2017 (5 pages).

* cited by examiner

US 11,265,840 B2

DATA TRANSMISSION AND MANAGEMENT FOR POSITIONING MOBILE DEVICES

CROSS REFERENCE TO RELATED APPLICATIONS

This patent document claims the benefit of priority to International Patent Application No. PCT/CN2018/075913, filed on Feb. 9, 2018. The entire contents of the before-mentioned patent applications are incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY OF PARTICULAR EMBODIMENTS

This document discloses methods, systems, and devices related to digital wireless communication, and more specifically, to techniques related to data transmission and management for positioning User Equipment (UE) in a network.

In one representative aspect, a method for wireless communication is disclosed. The method includes receiving, at a wireless communication node, a first paging message from a network node, wherein the first paging message includes information that facilitate positioning a mobile device in a wireless network; and transmitting, from the wireless communication node, a second paging message to the mobile device, wherein the second paging message includes the information that facilitate positioning the mobile device in the first paging message.

In some embodiments, the information that facilitates positioning the mobile device in the wireless network comprises at least one of the following: a request for location information, an indicator indicating a change of assistance data for one or more cells, or a subset of assistance data for one or more cells.

In some embodiments, the second paging message includes additional information that facilitates positioning the mobile device in the wireless network. In some implementations, the additional information that facilitates positioning the mobile device in the wireless network includes an indicator indicating an early data transmission.

In another representative aspect, a method for wireless communication is disclosed. The method includes receiving, at a mobile device, a paging message that includes information that facilitates positioning the mobile device in a wireless network.

In some embodiments, the information that facilitates positioning the mobile device in the wireless network comprises at least one of the following: a request for location information, an indicator indicating a change of assistance data for one or more cells, a subset of assistance data for one or more cells, or an indicator indicating an early data transmission.

In some embodiments, the method further includes reporting, from the mobile device to a network node, capabilities of the mobile device for obtaining location information; and requesting, by the mobile device, assistance data for positioning the mobile device in the wireless network from the network node. In some implementations, reporting the capabilities of the mobile device is performed by transmitting, from the mobile device to the network node, a first message to report the capabilities of the mobile device for obtaining location information. In some implementations, requesting the assistance data is performed by transmitting, from the mobile device to the network node, a second message configured to request the assistance data for positioning the mobile device in the wireless network. Alternatively, in some implementations, reporting the capabilities of the mobile device and requesting the assistance data are performed by transmitting, from the mobile device to the network node, a third message to report the capabilities of the mobile device for obtaining location information and request, from the network node, the assistance data for positioning the mobile device in the wireless network.

In another representative aspect, a method for wireless communication is disclosed. The method includes receiving, from a second network node, a request for positioning a mobile device in the wireless network, the request including information for one or more cells associated with a tracking area of the mobile device; and transmitting, from the first network node to the second network node, requested assistance data corresponding to the one or more cells associated with the tracking area of the mobile device, wherein the requested assistance data is determined based on stored assistance data for positioning the mobile device in the wireless network.

In some embodiments, the first network node includes an Evolved Serving Mobile Location Center. In some embodiments, the second network node includes a Mobility Management Entity.

In another representative aspect, a method for wireless communication is disclosed. The method includes receiving, at a wireless communication node, a first message from a mobile device in a random access procedure, wherein the first message includes information that facilitates positioning a mobile device in a wireless network; and transmitting, from the wireless communication node, a second message to the mobile device in the random access procedure, wherein the second message includes assistance data for positioning the mobile device.

In some embodiments, the information that facilitates positioning the mobile device in the wireless network includes capabilities of the mobile device for obtaining location information, or a request for assistance data for positioning the mobile device in the wireless network.

In another representative aspect, a method for wireless communication is disclosed. The method includes transmitting, from a mobile device, a first message to a wireless communication node in a random access procedure, wherein the first message includes information that facilitates positioning the mobile device in a wireless network; and receiving, at the mobile device, a second message from the wireless communication node in the random access procedure, wherein the second message includes assistance data for positioning the mobile device.

In some embodiments, the information that facilitates positioning the mobile device in the wireless network includes capabilities of the mobile device for obtaining location information, or a request for assistance data for positioning the mobile device in the wireless network.

In another representative aspect, a method for wireless communication is disclosed. The method includes receiving, at a wireless communication node, a first message from a mobile device in a random access procedure, wherein the first message includes information that facilitates positioning a mobile device in a wireless network; and transmitting, from the wireless communication node, a second message to the mobile device in the random access procedure, wherein the second message includes an indicator to instruct the mobile device to enter a connected state for receiving assistance data for positioning the mobile device.

In some embodiments, the information that facilitates positioning the mobile device in the wireless network includes capabilities of the mobile device for obtaining location information, or a request for assistance data for positioning the mobile device in the wireless network.

In another representative aspect, a method for wireless communication is disclosed. The method includes transmitting, from a mobile device, a first message to a wireless communication node in a random access procedure, wherein the first message includes information that facilitates positioning a mobile device in a wireless network; and receiving, at the mobile device, a second message from the wireless communication node in the random access procedure, wherein the second message includes an indicator instructing the mobile device to enter a connected state for receiving assistance data for positioning the mobile device.

In some embodiments, the information that facilitates positioning the mobile device in the wireless network includes capabilities of the mobile device for obtaining location information, or a request for assistance data for positioning the mobile device in the wireless network.

In another representative aspect, a wireless communications apparatus comprising a processor is disclosed. The processor is configured to implement a method described herein.

In yet another representative aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

In wireless communication systems, mobile device positioning functionality provides mechanisms, based on measuring radio signals, to support or assist the calculation of the geographical position of a mobile device (e.g., a UE). The position knowledge of a UE can be used, for example, in support of Radio Resource Management functions, as well as location-based services for operators, subscribers, and third-party service providers.

Figure 1:
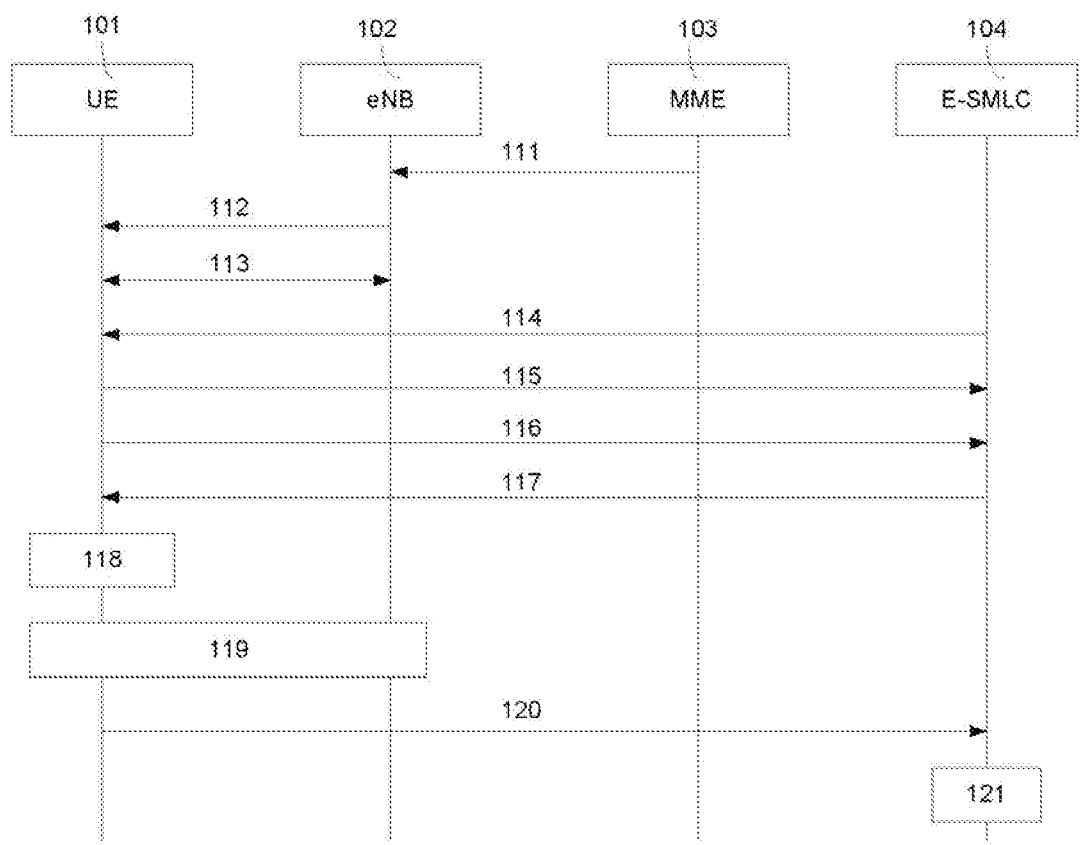
FIG. 1 is a diagram showing representative signaling steps of a positioning process used in the current wireless communication systems.

FIG. 1 is a diagram showing representative signaling steps of a positioning process used in the current wireless communication systems. For a UE in an idle state, the positioning process can be triggered when the network side has a positioning requirement. For example, a Mobility Management Entity (MME) 103 sends a first paging message 111 to a base station 102 (e.g., an evolved NodeB (eNB), or a gNB). The UE 101 is initially in an idle state. The base station 102 wakes up the UE 101 by sending the UE a second paging message 112. The UE 101 then triggers a random access procedure 113 so that it can switch to a connected state. After the UE 101 is in the connected state, a positioning server 104, such as an Evolved Serving Mobile Location Center (E-SMLC), exchanges relevant positioning information with the UE 101. For example, the E-SMLC 104 sends a message 114 to the UE 101 to request its location information. The UE first sends a message 115 to the E-SMLC 104 to report its positioning capabilities. The UE then sends a message 116 to the E-SMLC 104 to request assistance data. After the UE receives the assistance data in a message 117 from the E-SMLC 104, it enters into the idle state 118 again to perform positioning measurements. After the measurements are completed, the UE switches back into the connected state 119 to report its measurements to the E-SMLC 104 in a message 120. The E-SMLC 104 can obtain the location information 121 of the UE after receiving the measurements from the UE 101.

Currently, the Narrow Band (NB) Internet of Things (IoT) systems only support idle state positioning. That is, the positioning measurement is performed in the idle state only. In order to complete the positioning process, the UE must undergo several state transitions: as shown in FIG. 1, the UE switches from the idle state to the connected state after receiving the paging message, switches to the idle state to perform measurements, and switches back to the connected state to report the measurements. Furthermore, in many cases, the assistance data for the UE remains unchanged, yet the UE requests it for each positioning process regardless whether its position has changed.

Therefore, the current positioning process is inefficient in terms of bandwidth utilization and complexity of implementation. The techniques described in the present document can be used by embodiments in which the UE can undergo fewer number of state transitions and obtain the assistance data when desirable. This patent document describes methods and corresponding apparatus to allow the positioning server to store the assistance data such that the UE requests assistance data only when the assistance data changes. The disclosed techniques allow for UE embodiments that avoid undesirable state transitions and reduce the amount of data transmitted for the assistance data, thereby reducing system resource overhead and power consumption of the UE.

Details of the disclosed techniques are described in the following embodiments.

Example Embodiment 1

Figure 2:
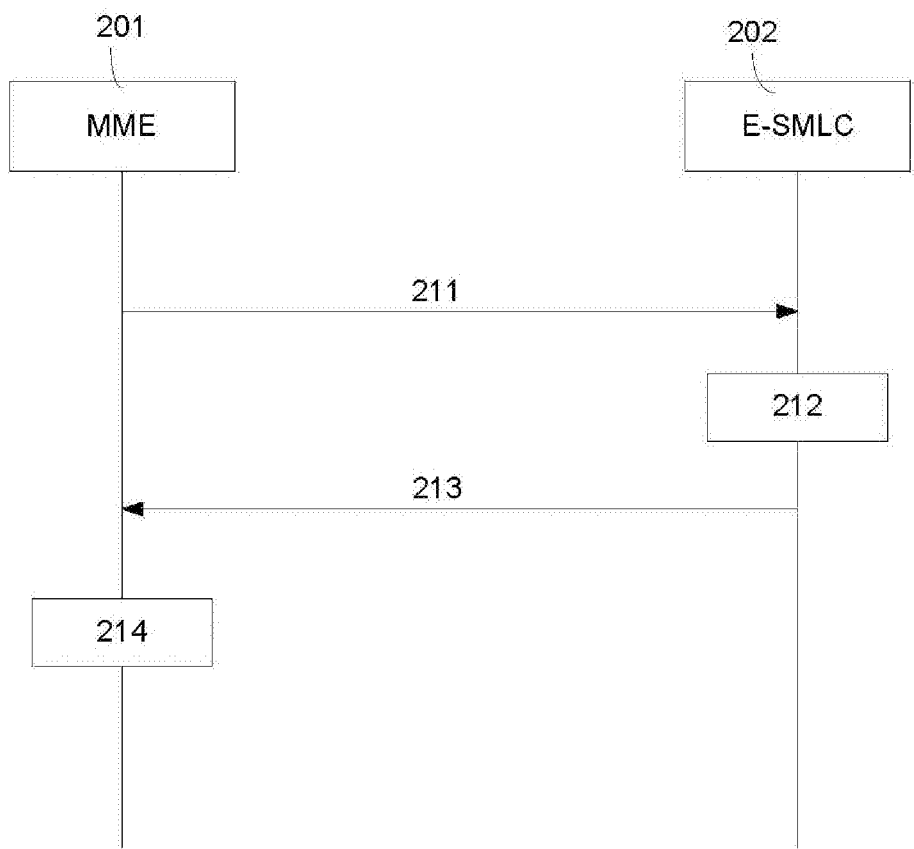
FIG. 2 is a diagram showing a representative signaling process in accordance with the disclosed techniques.

FIG. 2 is a diagram showing a representative signaling process in accordance with the disclosed techniques. In this embodiments, the E-SMLC stores assistance data locally so that it can detect changes in the assistance data.

As shown in FIG. 2, the MME 201 sends a positioning request message 211 to the E-SMLC 202. The message 211 includes information of the cells that are in the tracking area of the UE. After receiving the message 211, the E-SMLC 202 determines, based on the stored assistance data, whether the assistance data for each of the cells in the tracking area of the UE has changed.

In some embodiments, the E-SMLC 202 stores cell-specific assistance data for a UE. Based on the cell-specific assistance data, the E-SMLC 202 sends a message 213 to the MME 201 to indicate whether the assistance data for each of the cells in the tracking area of the UE has changed. If the assistance data has changed for one or more cells in the tracking area, the E-SMLC 202 can include information indicating such changes in the message 213. In some embodiments, the message 213 includes one or more indicators to indicate the assistance data has changed for the cells in the tracking area. In some embodiments, the message 213 includes the changed portion of the assistance data (e.g., $\Delta AssistanceData=AssistanceData_{new}-AssistanceData_{old}$) for each changed cell in the tracking area. If the assistance data has not changed for the cells in the tracking area, the E-SMLC 202 can include one or more indicators indicating that the assistance data has not changed for the cells.

In some embodiments, the E-SMLC 202 stores UE-specific positioning assistance data for a UE. In such cases, the E-SMLC 202 can inform the MME 201 of UE's serving cell based on results of the last positioning process. The E-SMLC 202 can also indicate whether the assistance data for the serving cell has changed. If the assistance data of the serving cell has changed, the E-SMLC 202 can include information indicating such changes in the message 213. In some embodiments, the message 213 includes indicators to indicate the assistance data has changed for the serving cell. In some embodiments, the message 213 includes the changed portion of the assistance data (e.g., $\Delta AssistanceData=AssistanceData_{new}-AssistanceData_{old}$) for the serving cell. If the assistance data has not changed for the serving cell, the E-SMLC 202 can include an indicator indicating that the assistance data has not changed for the serving cell.

The E-SMLC 202 can also indicate whether the assistance data for the non-serving cell(s) in the tracking area has changed. If the assistance data of the non-serving cell(s) has changed, the E-SMLC 202 can include information indicating such changes in the message 213. In some embodiments, the message 213 includes indicators to indicate the assistance data has changed for the non-serving cell(s) in the tracking area. In some embodiments, the message 213 includes the changed portion of the assistance data (e.g., $\Delta AssistanceData=AssistanceData_{new}-AssistanceData_{old}$) for the non-serving cell(s) in the tracking area. If the assistance data has not changed for the non-serving cell(s) in the tracking area, the E-SMLC 202 can include one or more indicators indicating that the assistance data has not changed for the non-serving cell(s).

After receiving the message 213, the MME 201 determines if it needs to include information related to the positioning of the UE in its paging messages. In some embodiments, the MME 201 can include information in a paging message to indicate that assistance data has not changed for one or more cells. In some embodiments, the MME 201 can include information in a paging message to indicate that the assistance data has changed for one or more cells, so that a subsequent paging message can trigger the UE to request the new assistance data.

After receiving the paging message from the MME 201 at a base station (e.g., eNB), the base station can forward the information related to the positioning of the UE in its corresponding paging messages to the UE.

Figure 3:
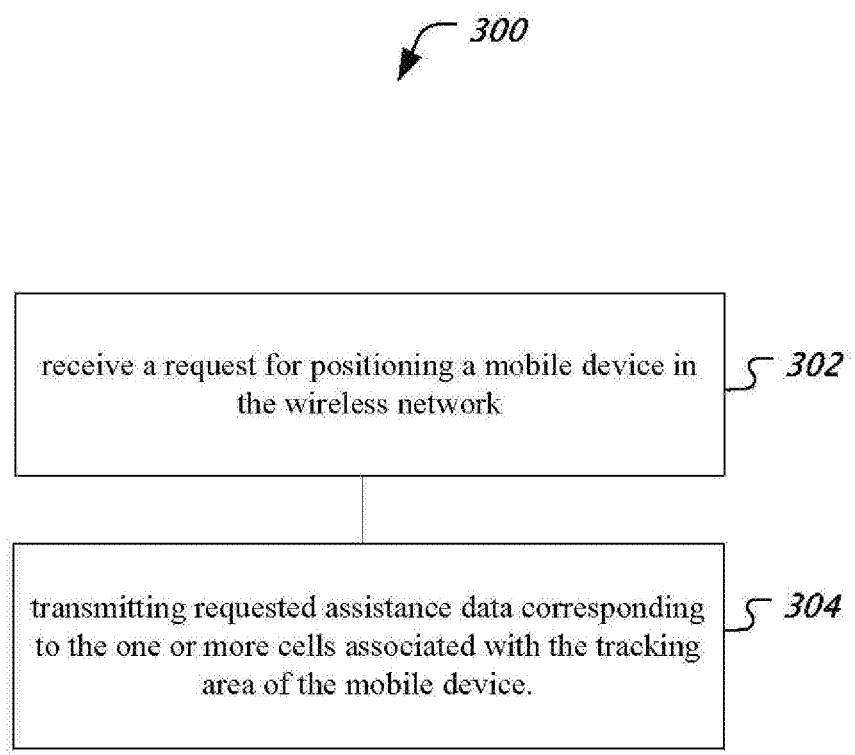
FIG. 3 is a flowchart representation of a method for wireless communication.

FIG. 3 is a flowchart representation of a method 300 for wireless communication. The method 300 includes, at 302, receiving, from a second network node, a request for positioning a mobile device in the wireless network, the request including information for one or more cells associated with a tracking area of the mobile device. The method 300 also includes, at 304, transmitting, from the first network node to the second network node, requested assistance data corresponding to the one or more cells associated with the tracking area of the mobile device, wherein the requested assistance data is determined based on stored assistance data for positioning the mobile device in the wireless network.

Example Embodiment 2

This embodiment describes a representative paging message that can be used to reduce the signaling overhead in the positioning process.

Figure 4:
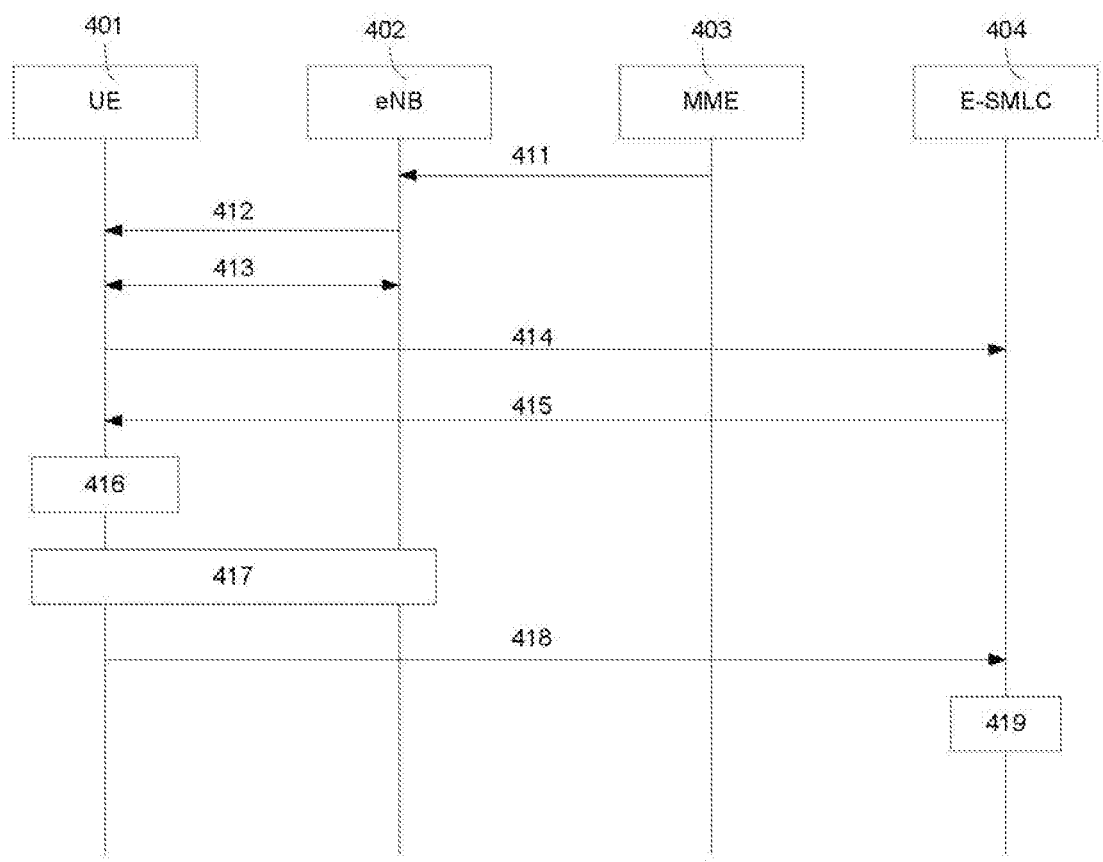
FIG. 4 is a diagram showing another representative signaling process in accordance with the disclosed techniques.

FIG. 4 is a diagram showing a representative signaling process in accordance with the disclosed techniques. The positioning process can be triggered when the network side has a positioning requirement. For example, the MME 403 sends a first paging message 411 to a eNB 402. As discussed in Example Embodiment 1, the MME 403 includes information related to the positioning of the UE in the first paging message 411 based on information provided by the E-SMLC 404.

The UE 401 is initially in an idle state. The eNB 402 sends the UE 401 a second paging message 412. The eNB 402 can request UE's positioning capabilities in the second paging message 412. In some embodiments, the eNB 402 can include the information related to the positioning of the UE from the first paging message 411. For example, the eNB 402 can include information in the second paging message 412 to indicate that assistance data has not changed for one or more cells in the tracking area of the UE. In some embodiments, the eNB 402 can include information in the second paging message 412 to indicate that the assistance data has changed for one or more cells in the tracking area to trigger the UE to request the new assistance data for the corresponding cells. In some embodiments, the eNB 402 can include a request for location information in the second paging message 412 to trigger the UE to request assistance data and report positioning measurements.

In this particular embodiment, the eNB 402 requests UE's positioning capabilities in the second paging message 412. The eNB 402 also includes a request for location information in the second paging message 412 to trigger the UE 401 to request assistance data and report positioning measurements. After receiving the second paging message 412, the UE 401 starts a Radio Resource Control (RRC) connection establishment procedure 413 to enter into a connected state. After the UE 401 is in the connected state, the UE 401 can send a message 414 to the E-SMLC 404 to report its positioning capabilities. Based on the information included in the second paging message 412, the UE also requests assistance data from the E-SMLC 404 using the same message 414. In some implementation, the UE can request the assistance data from the E-SMLC 404 using a separate message.

After the UE 401 receives the assistance data in a message 415 from the E-SMLC 404, it enters into the idle state 416 again to perform positioning measurements. The UE 401 then switches back to the connected state 417 after the measurements are completed to report the measurements to the E-SMLC 404 in a message 418. The E-SMLC 404 can obtain the location information 419 of the UE by calculating the measurements from the UE 401.

Figure 5:
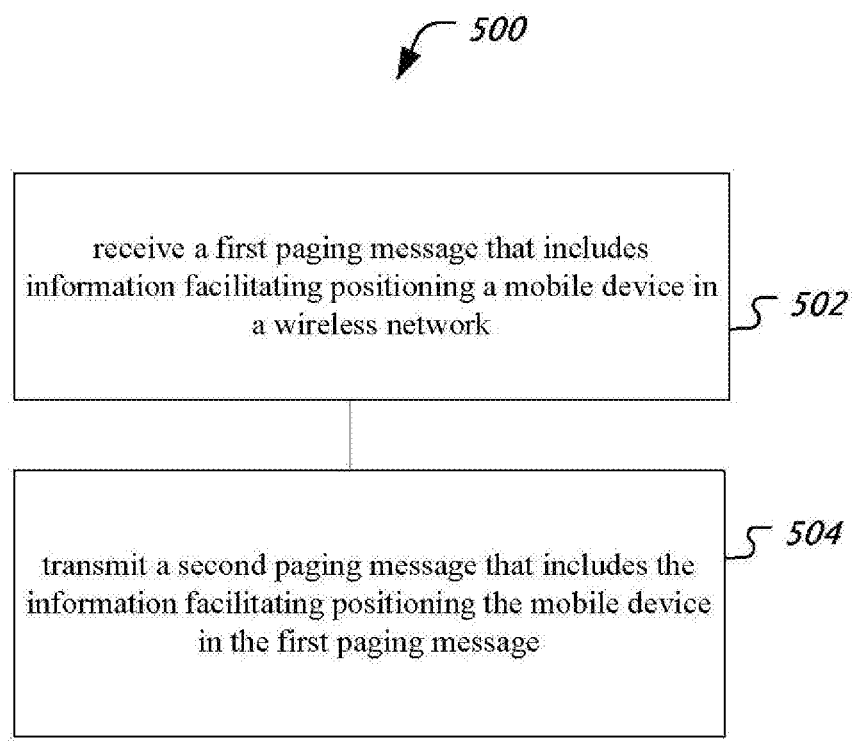
FIG. 5 is a flowchart representation of another method for wireless communication.

FIG. 5 is a flowchart representation of a method 500 for wireless communication. The method 500 includes, at 502, receiving, at a wireless communication node, a first paging message from a network node, wherein the first paging message includes information that facilitates positioning a mobile device in a wireless network. The method 500 also includes, at 504, transmitting, from the wireless communication node, a second paging message to the mobile device, wherein the second paging message includes the information that facilitates positioning the mobile device in the first paging message.

Figure 6:
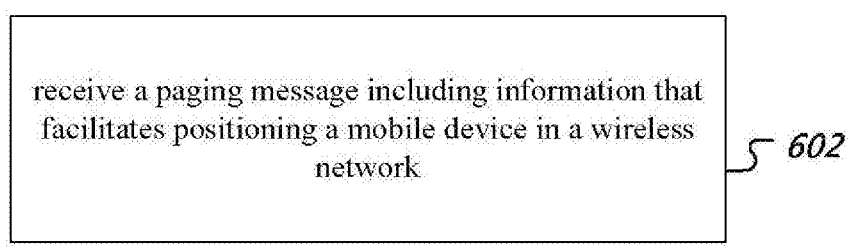
FIG. 6 is a flowchart representation of another method for wireless communication.

FIG. 6 is a flowchart representation of a method 600 for wireless communication. The method 600 includes, at 602, receiving, at a mobile device, a paging message that includes information that facilitate positioning the mobile device in a wireless network.

In some embodiments, the method 600 also includes reporting, from the mobile device to a network node, capabilities of the mobile device for obtaining location information. In some embodiments, the method 600 further includes requesting, by the mobile device, assistance data for positioning the mobile device in the wireless network from the network node.

Example Embodiment 3

This embodiment describes a representative signaling process that can be used to reduce state transitions at the UE.

Figure 7:
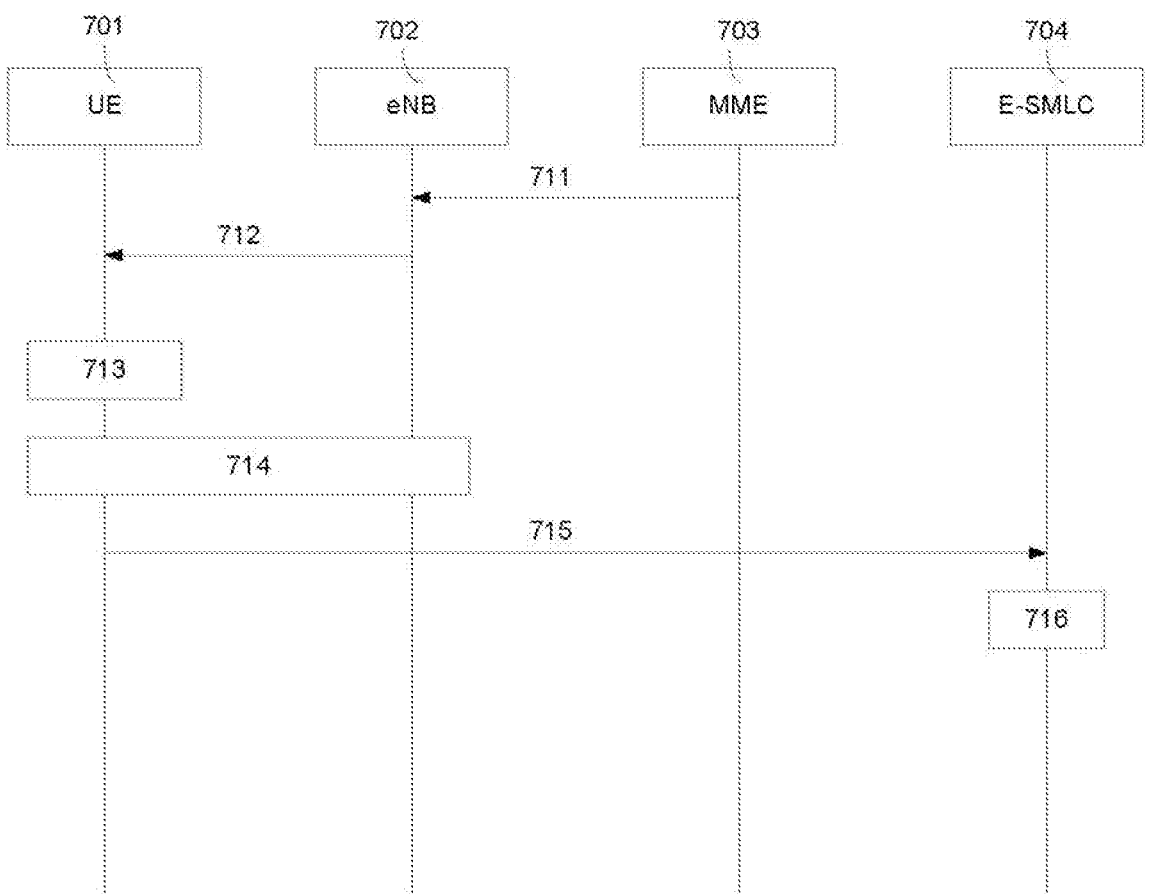
FIG. 7 is a flowchart showing another representative signaling process in accordance with the disclosed techniques.

FIG. 7 is a flowchart showing a representative signaling process in accordance with the disclosed techniques. The positioning process can be triggered when the network side has a positioning requirement. For example, the MME 703 sends a first paging message 711 to the eNB 702. As discussed in Example Embodiment 1, the MME 703 includes information related to the positioning of the UE in the first paging message 711 based on information provided by the E-SMLC 704.

The UE 701 is initially in an idle state. The eNB 702 sends the UE 701 a second paging message 712. The eNB 702 can request UE's positioning capabilities in the second paging message 712. In some embodiments, the eNB 702 can include the information related to the positioning of the UE from the first paging message 711. For example, the eNB 702 can include information in the second paging message 712 to indicate that assistance data has not changed for one or more cells in the tracking area of the UE. In some embodiments, the eNB 702 can include information in a paging message to indicate that the assistance data has changed for one or more cells in the tracking area to trigger the UE to request the new assistance data for the corresponding cells. In some embodiments, the eNB 702 can include a request for location information in the second paging message 712 to trigger the UE to request assistance data and report positioning measurements.

In this particular embodiment, the eNB 702 includes information in the second paging message 712 to indicate that assistance data has not changed for the cells in the tracking area of the UE. After the UE 701 receives the second paging message 712, the UE 701 detects, based on the information included in the second paging message 712, that the assistance data has not changed. Thus, the UE 701 can remain in the idle station 713 to perform positioning measurements. After the measurements are completed, the UE 701 enters into a connected state 714 to report its measurements to the E-SMLC 704 in a message 715. The E-SMLC 704 can obtain the location information 716 of the UE by calculating the measurements from the UE 701.

Example Embodiment 4

This embodiment describes a representative signaling process that can be used to reduce the amount of data transmitted for the assistance data.

Figure 8:
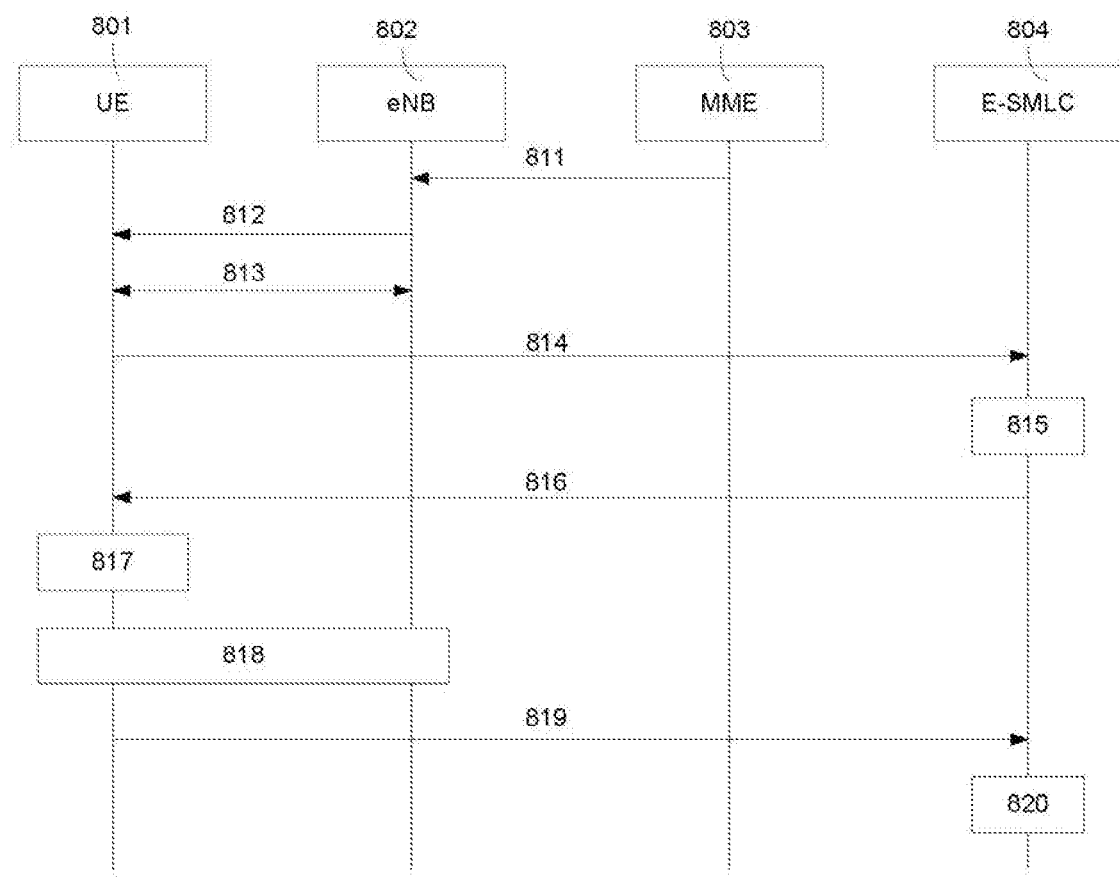
FIG. 8 is a flowchart showing another representative signaling process in accordance with the disclosed techniques.

FIG. 8 is a flowchart showing a representative signaling process in accordance with the disclosed techniques. The positioning process can be triggered when the network side has a positioning requirement. For example, the MME 803 sends a first paging message 811 to a eNB 802. As discussed in Example Embodiment 1, the MME 803 includes information related to the positioning of the UE in the first paging message 811 based on information provided by the E-SMLC 804.

The UE is initially in an idle state. The eNB 802 sends the UE 801 a second paging message 812. The eNB 802 can request UE's positioning capabilities in the second paging message 812. In some embodiments, the eNB 802 can include the information related to the positioning of the UE from the first paging message 811. For example, the eNB 802 can include information in the second paging message 812 to indicate that assistance data has not changed for one or more cells in the tracking area of the UE. In some embodiments, the eNB 802 can include information in a paging message to indicate that the assistance data has changed for one or more cells in the tracking area to trigger the UE to request the new assistance data for the corresponding cells. In some embodiments, the eNB 802 can include a request for location information in the second paging message 812 to trigger the UE to request assistance data and report positioning measurements.

In this particular embodiment, the eNB 802 requests UE's positioning capabilities in the second paging message 812.

The eNB 802 also includes information in the second paging message 812 to indicate that the assistance data has changed for one or more cells in the tracking area to trigger the UE to request the new assistance data for the corresponding cells. After the UE receives the second paging message 812, the UE detects, based on the information included in the second paging message 812, that the assistance data has changed. The UE 801 then starts a Radio Resource Control (RRC) connection establishment procedure 813 to enter a connected state. After the UE 801 is in the connected state, the UE 801 sends a message 814 to the E-SMLC 804 to report its positioning capabilities and request the changed assistance data (e.g., $\Delta$AssistanceData=AssistanceData$_{new}$-AssistanceData$_{old}$) from the E-SMLC 804. After receiving the request 814 from the UE, the E-SMLC 804 determines the changed assistance data 815 based on the stored assistance data information. The E-SMLC 804 then sends the changed assistance data to the UE 801 in a message 816. Here, the amount of data transmitted for assistance data can be greatly reduced if the change is relatively trivial.

After the UE 801 receives the changed assistance data in the message 816 from the E-SMLC 804, it enters into the idle state 817 to perform positioning measurements. After the measurements are completed, the UE 801 enters into the connected state 817 to report its measurements to the E-SMLC 804 in a message 819. The E-SMLC 804 can obtain the location information 820 of the UE by calculating the measurements from the UE 801.

Example Embodiment 5

Early data transmission allows the UE and the eNB to append data to messages in a random access procedure, e.g., appending uplink data to Msg3 and downlink data to Msg4. This embodiment describes a representative signaling process that can be used to enabled a UE that is capable of early data transmission (EDT) to obtain assistance data in the random access procedure.

Figure 9:
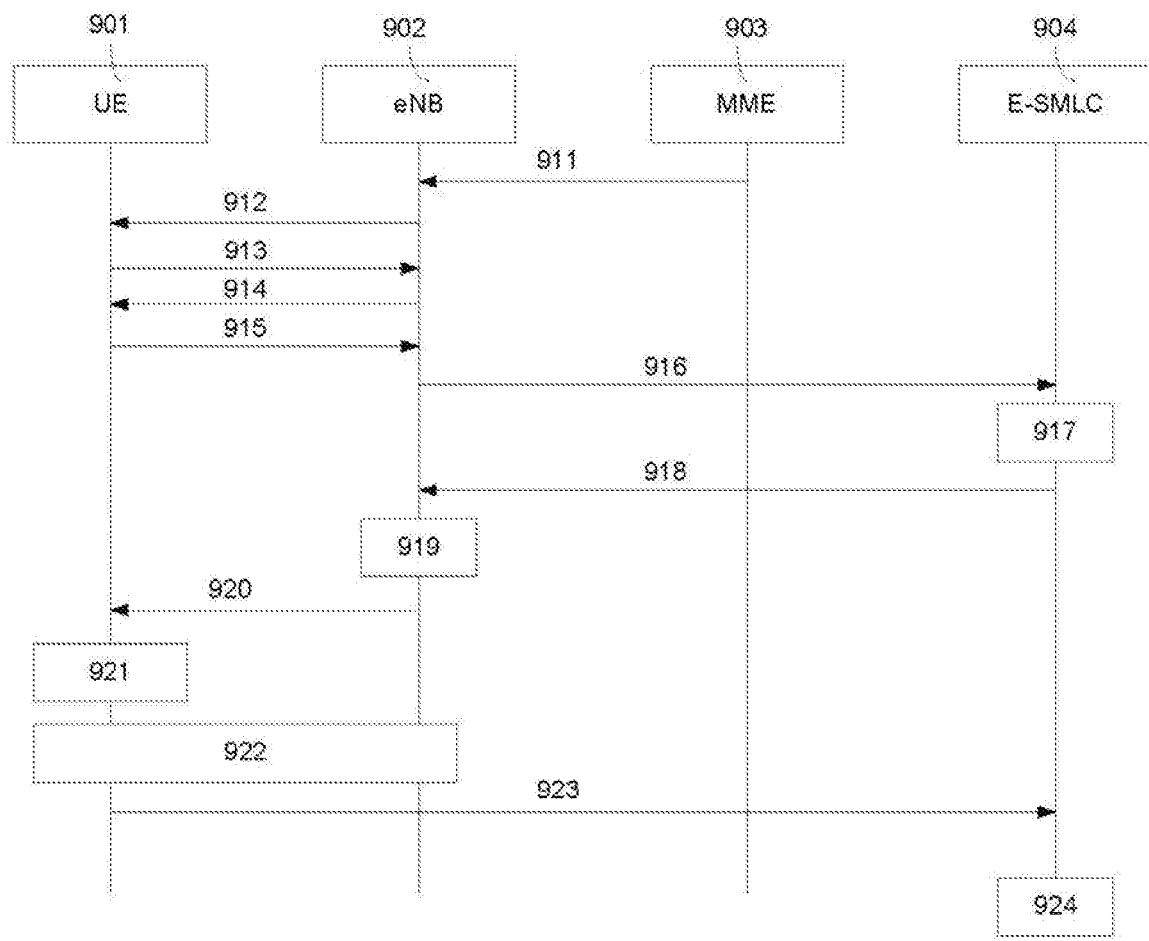
FIG. 9 is a flowchart showing another representative signaling process in accordance with the disclosed techniques.

FIG. 9 is a flowchart showing a representative signaling process in accordance with the disclosed techniques. The positioning process can be triggered when the network side has a positioning requirement. For example, the MME 903 sends a first paging message 911 to a eNB 902. As discussed in Example Embodiment 1, the MME 903 includes information related to the positioning of the UE in the first paging message 911 based on information provided by the E-SMLC 904.

The UE 901 is initially in an idle state. The eNB 902 sends the UE 901 a second paging message 912. The eNB 902 can request UE's positioning capabilities in the second paging message 912. In some embodiments, the eNB 902 can include information that indicates early data transmission (EDT) to instruct the UE to append data in a random access procedure. In some embodiments, the eNB 902 can include the information related to the positioning of the UE from the first paging message 911. For example, the eNB 902 can include information in the second paging message 912 to indicate that assistance data has not changed for one or more cells in the tracking area of the UE. In some embodiments, the eNB 902 can include information in the second paging message 912 to indicate that the assistance data has changed for one or more cells in the tracking area to trigger the UE to request the new assistance data for the corresponding cells. In some embodiments, the eNB 902 can include a request for location information in the second paging message 912 to trigger the UE to request assistance data and report positioning measurements.

In this particular embodiment, the eNB 902 includes information that indicates early data transmission (EDT) to instruct the UE to initiate a random access procedure with EDT. After the UE receives the second paging message 912, the UE detects the information for the EDT and initiates the random access procedure. The UE first sends a Msg1 913 to the eNB 902, and receives a random access response in Msg2 914 from the eNB 902. Operating with early data transmission, the UE can send user data in parallel with transmission of Mg3 (i.e., RRC connection request message). For example, Msg3 can include a special information element (e.g., dedicatedInfoNAS) so that the UE can include its positioning capabilities and request for assistance data in Msg3 915.

After receiving such information in Msg3 915, the eNB sends a message 916 to the E-SMLC 904 to report UE's positioning capabilities and to request the corresponding assistance data. The E-SMLC 904 determines the changed assistance data 917 (e.g., $\Delta$AssistanceData=AssistanceData$_{new}$-AssistanceData$_{old}$) based on the stored assistance data information. The E-SMLC 904 then sends the changed assistance data to the eNB 902 in a message 918. The eNB determines if the received assistance data can be carried in Msg4. If so, the eNB includes the changed assistance data in Msg4 920 to the UE. For example, Msg4 can include a special information element so that the eNB can include the changed assistance data in Msg4 920.

After the UE 901 receives the changed assistance data in Msg4 920 from the eNB 902, it performs positioning measurements in the idle state 921 (without state transition). After the measurements are completed, the UE 901 enters into the connected state 922 to report its measurements to the E-SMLC 904 in a message 923. The E-SMLC 904 can obtain the location information 924 of the UE by calculating the measurements from the UE 901.

Example Embodiment 6

This embodiment describes another representative signaling process that can be used to enabled a UE that is capable of early data transmission (EDT) to obtain assistance data in the random access procedure.

Figure 10:
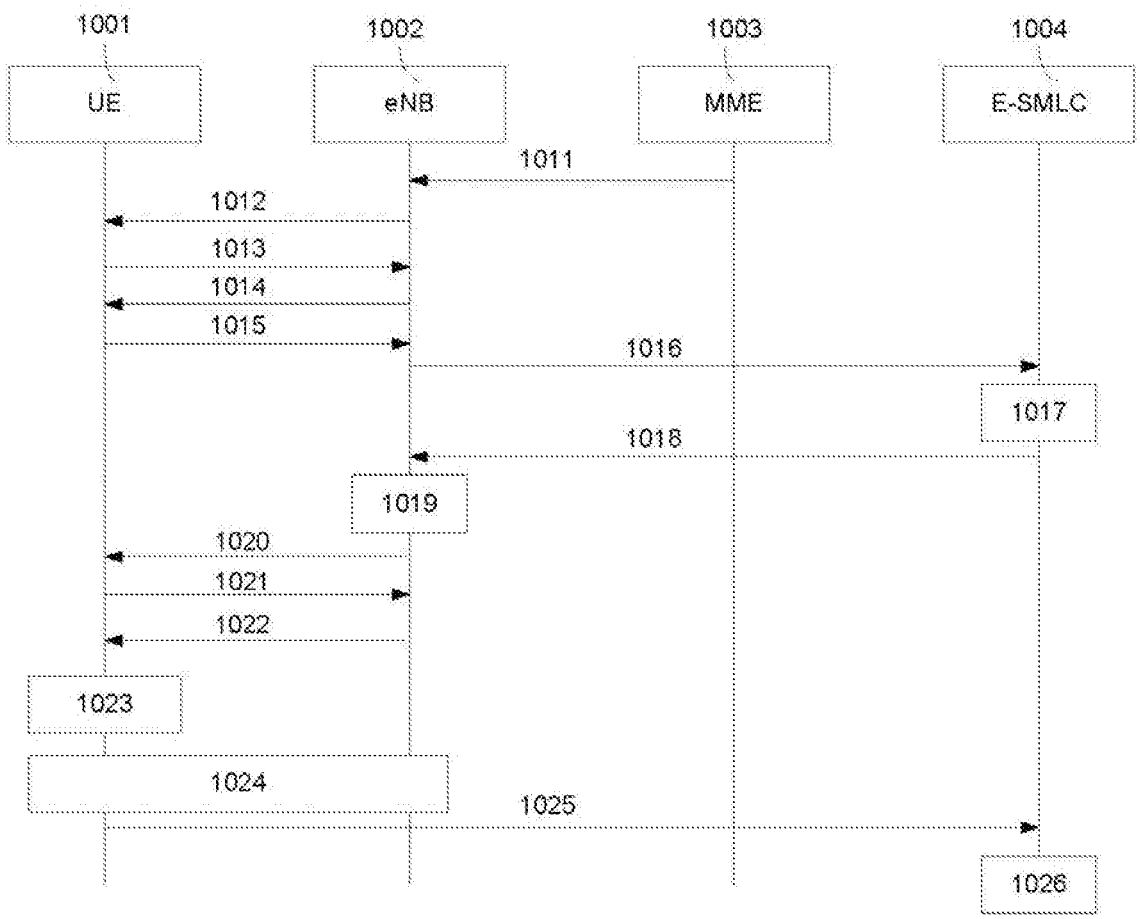
FIG. 10 is a flowchart showing another representative signaling process in accordance with the disclosed techniques.

FIG. 10 is a flowchart showing a representative signaling process in accordance with the disclosed techniques. The positioning process can be triggered when the network side has a positioning requirement. For example, the MME 1003 sends a first paging message 1011 to a eNB 1002. As discussed in Example Embodiment 1, the MME 1003 includes information related to the positioning of the UE in the first paging message 1011 based on information provided by the E-SMLC 1004.

The UE 1001 is initially in an idle state. The eNB 1002 sends the UE 1001 a second paging message 1012. The eNB 1002 can request UE's positioning capabilities in the second paging message 1012. In some embodiments, the eNB 1002 can include information that indicates an early data transmission (EDT) to instruct UEs that are capable of EDT to append data in a random access procedure. In some embodiments, the eNB 1002 can include the information related to the positioning of the UE from the first paging message 1011. For example, the eNB 1002 can include information in the second paging message 1012 to indicate that assistance data has not changed for one or more cells in the tracking area of the UE. In some embodiments, the eNB 1002 can include information in a paging message to indicate that the assistance data has changed for one or more cells in the tracking area to trigger the UE to request the new assistance data for the corresponding cells. In some embodiments, the eNB 1002 can include a request for location information in the second paging message 1012 to trigger the UE to request assistance data and report positioning measurements.

In this particular embodiment, the eNB 1002 includes information that indicates an early data transmission (EDT) to instruct the UE to initiate a random access procedure with EDT. After the UE receives the second paging message 1012, the UE detects the information for the EDT and initiates the random access procedure. The UE first sends a Msg1 1013 to the eNB 1002, and receives a random access response in Msg2 1014 from the eNB 1002. Operating with early data transmission, the UE can send user data in parallel with transmission of Mg3 (i.e., RRC connection request message). For example, Msg3 can include a special information element (e.g., dedicatedInfoNAS) so that the UE can include its positioning capabilities and request for assistance data in Msg3 1015.

After receiving such information in Msg3 1015, the eNB sends a message 1016 to the E-SMLC 1004 to report UE's positioning capabilities and to request corresponding assistance data. The E-SMLC 1004 determines the changed assistance data 1017 (e.g., $\Delta\text{AssistanceData}=\text{AssistanceData}_{new}-\text{AssistanceData}_{old}$) based on the stored assistance data information. The E-SMLC 1004 then sends the changed assistance data to the eNB 1002 in a message 1018. The eNB determines if the received assistance data can be carried in Msg4. In this embodiment, the received assistance data is too big to fit into the special information element in Msg4, so the eNB includes an indicator in Msg4 to direct the UE to enter a connected state for receiving the assistance data.

After the UE 1001 receives the Msg4 1020 from the eNB 1002, it sends a Msg5 1022 to the eNB to complete the random access process and enter a connected state. The UE 1001 then obtains the changed assistance data in message 1022 from the eNB 1002. The UE switches back to the idle state 1023 to perform positioning measurements. After the measurements are completed, the UE 1001 enters into the connected state 1024 again to report its measurements to the E-SMLC 1004 in a message 1025. The E-SMLC 1004 can obtain the location information 1026 of the UE by calculating the measurements from the UE 1001.

Figure 11A:
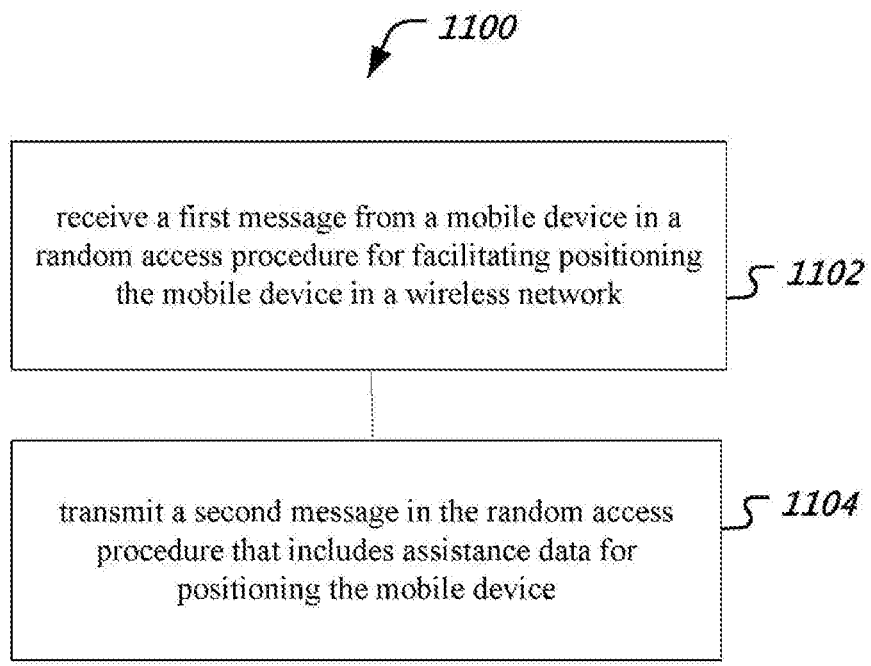
FIG. 11A is a flowchart representation of a method for wireless communication.

FIG. 11A is a flowchart representation of a method 1100 for wireless communication. The method includes, at 1102, receiving, at a wireless communication node, a first message from a mobile device in a random access procedure, wherein the first message includes information that facilitate positioning a mobile device in a wireless network. The method includes, at 1104, transmitting, from the wireless communication node, a second message to the mobile device in the random access procedure, wherein the second message includes assistance data for positioning the mobile device.

Figure 11B:
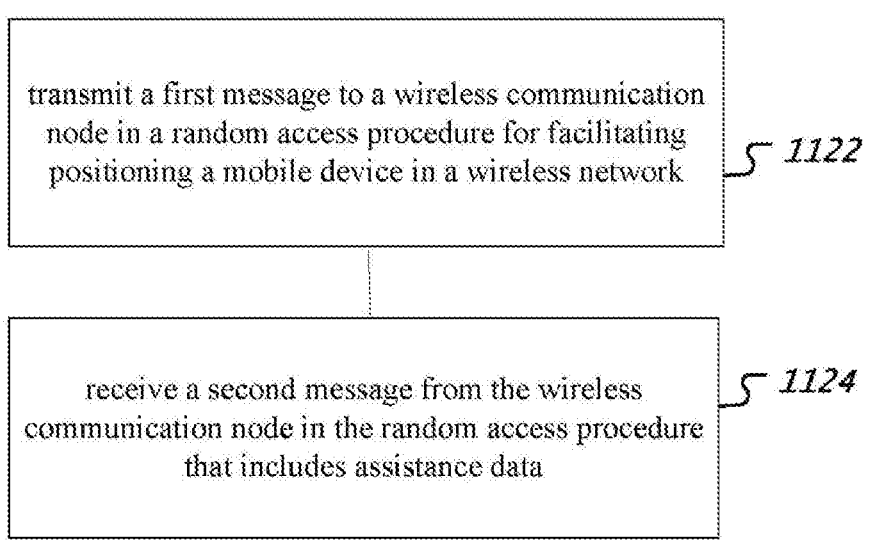
FIG. 11B is a flowchart representation of another method for wireless communication.

FIG. 11B is a flowchart representation of another method 1120 for wireless communication. The method includes, at 1122, transmitting, from a mobile device, a first message to a wireless communication node in a random access procedure, wherein the first message includes information that facilitates positioning the mobile device in a wireless network. The method also includes, at 1124, receiving, at the mobile device, a second message from the wireless communication node in the random access procedure, wherein the second message includes assistance data for positioning the mobile device.

Figure 12A:
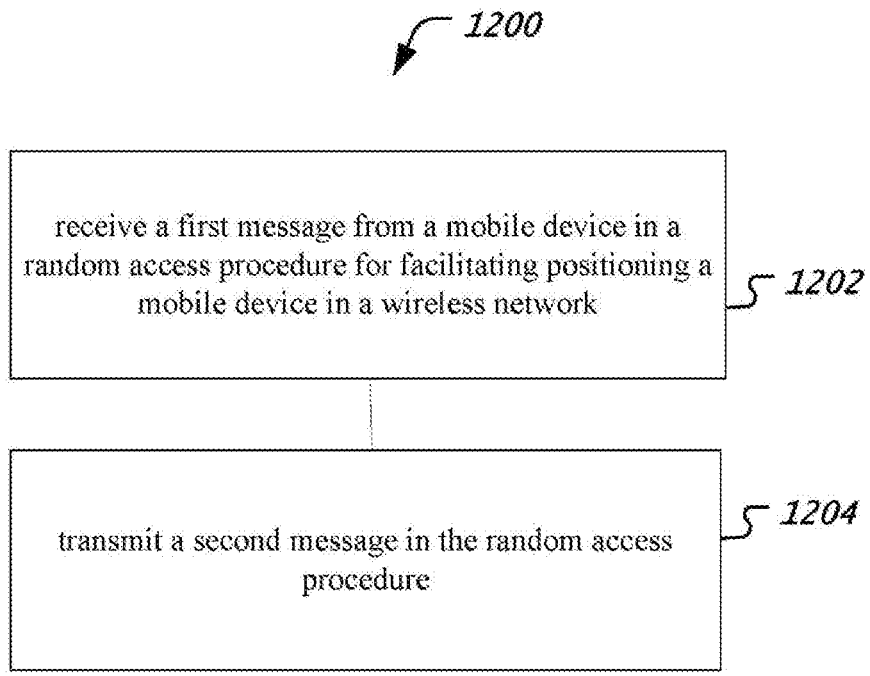
FIG. 12A is a flowchart representation of a method for wireless communication.

FIG. 12A is a flowchart representation of a method 1200 for wireless communication. The method includes, at 1202, receiving, at a wireless communication node, a first message from a mobile device in a random access procedure, wherein the first message includes information that facilitate positioning a mobile device in a wireless network. The method also includes, at 1204, transmitting, from the wireless communication node, a second message to the mobile device in the random access procedure, wherein the second message includes an indicator to instruct the mobile device to enter a connected state for receiving assistance data for positioning the mobile device.

Figure 12B:
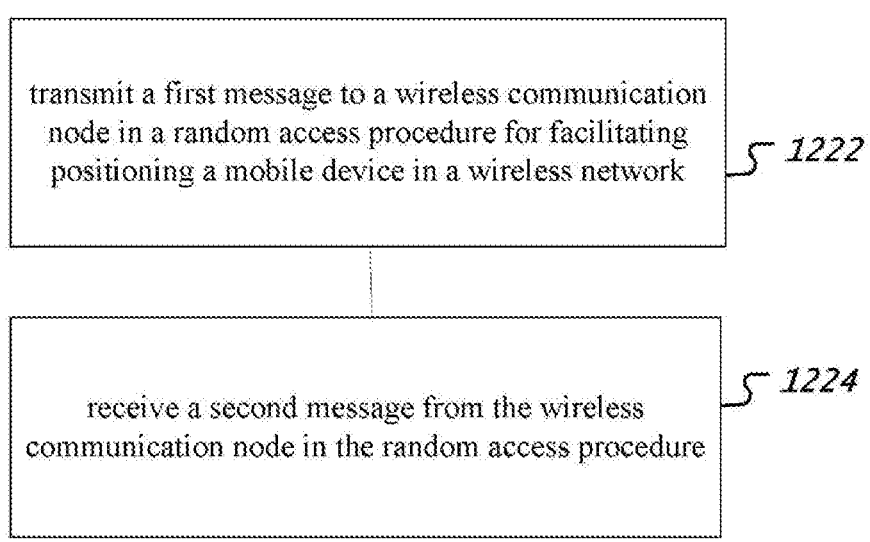
FIG. 12B is a flowchart representation of another method for wireless communication.

FIG. 12B is a flowchart representation of a method 1220 for wireless communication. The method includes, at 1222, transmitting, from a mobile device, a first message to a wireless communication node in a random access procedure, wherein the first message includes information that facilitates positioning a mobile device in a wireless network. The method also includes, at 1224, receiving, at the mobile device, a second message from the wireless communication node in the random access procedure, wherein the second message includes an indicator instructing the mobile device to enter a connected state for receiving assistance data for positioning the mobile device.

Figure 13:
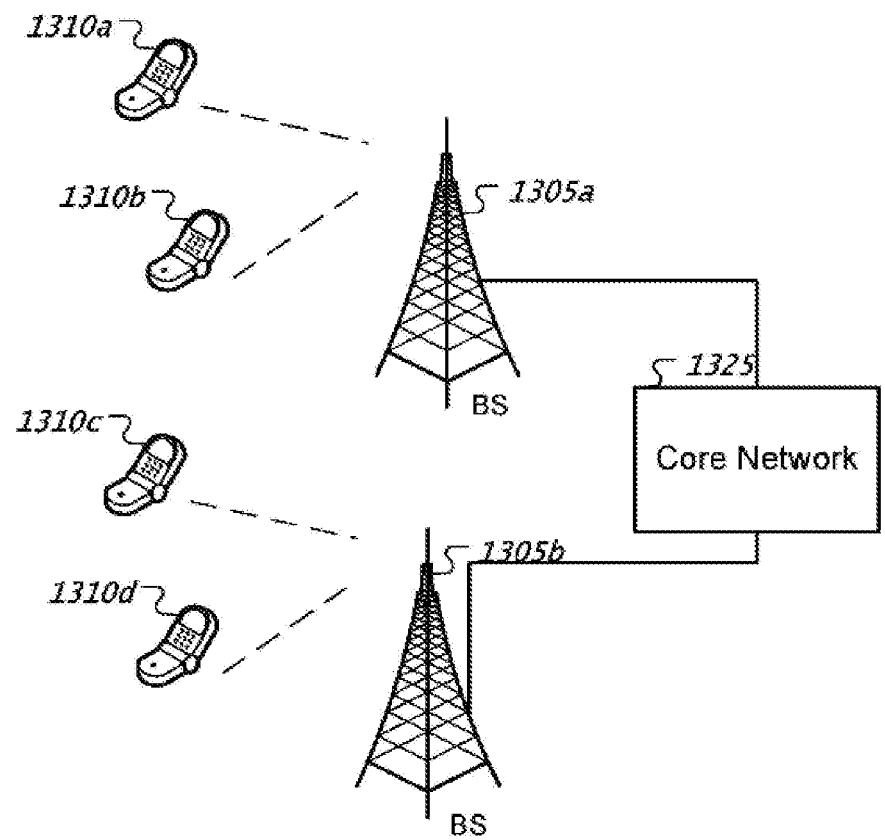
FIG. 13 shows an example of a wireless communication system where techniques in accordance with one or more embodiments of the present technology can be applied.

FIG. 13 shows an example of a wireless communication system where techniques in accordance with one or more embodiments of the present technology can be applied. A wireless communication system 800 can include one or more base stations (BSs) 1305a, 1305b, one or more wireless devices 1310a, 1310b, 1310c, 1310d, and a core network 1325. A base station 1305a, 1305b can provide wireless service to wireless devices 1310a, 1310b, 1310c and 1310d in one or more wireless sectors. In some implementations, a base station 1305a, 1305b includes directional antennas to produce two or more directional beams to provide wireless coverage in different sectors.

The core network 1325 can communicate with one or more base stations 1305a, 1305b. The core network 1325 provides connectivity with other wireless communication systems and wired communication systems. The core network may include one or more service subscription databases to store information related to the subscribed wireless devices 1310a, 1310b, 1310c, and 1310d. A first base station 1305a can provide wireless service based on a first radio access technology, whereas a second base station 1305b can provide wireless service based on a second radio access technology. The base stations 1305a and 1305b may be co-located or may be separately installed in the field according to the deployment scenario. The wireless devices 1310a, 1310b, 1310c, and 1310d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 14:
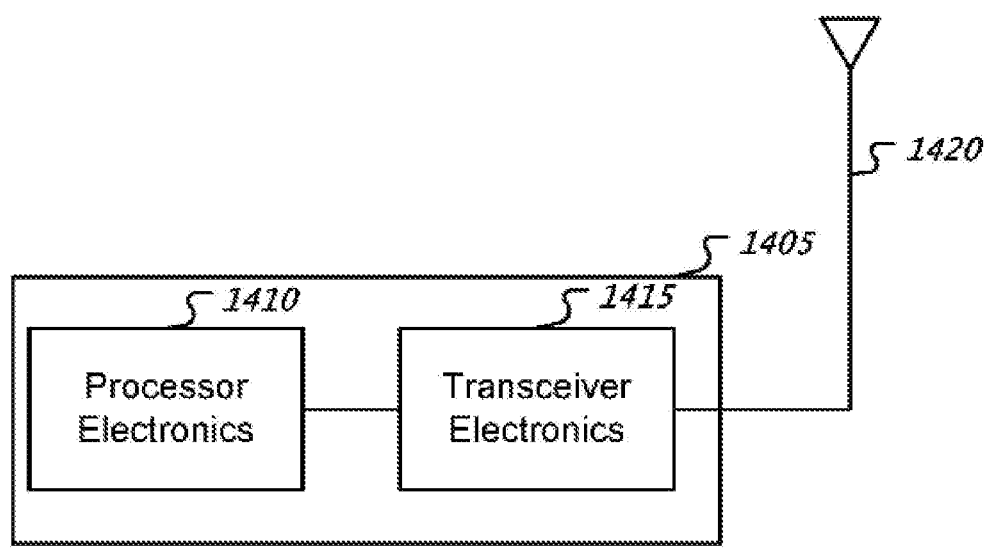
FIG. 14 is a block diagram representation of a portion of a radio station.

FIG. 14 is a block diagram representation of a portion of a radio station. A radio station 1405 such as a base station or a wireless device (or UE) can include processor electronics 1410 such as a microprocessor that implements one or more of the wireless techniques presented in this document. The radio station 1405 can include transceiver electronics 1415 to send and/or receive wireless signals over one or more communication interfaces such as antenna 1420. The radio station 1405 can include other communication interfaces for transmitting and receiving data. Radio station 1405 can include one or more memories (not explicitly shown) configured to store information such as data and/or instructions. In some implementations, the processor electronics 1410 can include at least a portion of the transceiver electronics 1415. In some embodiments, at least some of the disclosed techniques, modules or functions are implemented using the radio station 1405.

It is thus evident that methods and corresponding apparatus relating to data transmission and management for UE positioning are disclosed. Using the disclosed techniques, the positioning server in the core network can store the assistance data to determine if any changes have happened. The UE can avoid undesirable state transitions and reduce the amount of data transmitted for the assistance data, thereby reducing system resource overhead and power consumption of the UE.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for wireless communication, comprising:
  receiving, at a wireless communication node, a first paging message from a network node, wherein the first paging message includes information that facilitates positioning a mobile device in a wireless network, the information comprising an indicator indicating whether a change of assistance data for one or more cells has occurred; and
  transmitting, from the wireless communication node, a second paging message to the mobile device, wherein the second paging message includes the information that facilitates positioning the mobile device in the first paging message, and wherein the second paging message includes additional information that facilitates positioning the mobile device in the wireless network, the additional information comprising an indicator indicating an early data transmission.

2. The method of claim 1, wherein the information that facilitates positioning the mobile device in the wireless network further comprises at least one of: a request for location information, or a subset of assistance data for one or more cells.

3. A method for wireless communication, comprising:
receiving, at a mobile device from a wireless communication node, a paging message including information that facilitates positioning the mobile device in a wireless network, the information comprising an indicator indicating whether a change of assistance data for one or more cells has occurred, the information that facilitates positioning the mobile device in the wireless network further comprises at least one of: a request for location information, a subset of assistance data for one or more cells, or an indicator indicating an early data transmission; and
reporting, by the mobile device, positioning measurements to a network node in response to the paging message.

4. The method of claim 3, further comprising:
requesting, by the mobile device, assistance data for positioning the mobile device in the wireless network from the network node in case the indicator indicating a change of assistance data has occurred.

5. An apparatus for wireless communication comprising a processor and a memory including processor executable code, wherein the processor executable code upon execution by the processor configures the processor to:
receive a first paging message from a network node, wherein the first paging message includes information that facilitates positioning a mobile device in a wireless network, the information comprising an indicator indicating whether a change of assistance data for one or more cells has occurred; and
transmit a second paging message to the mobile device, wherein the second paging message includes the information that facilitates positioning the mobile device in the first paging message, wherein the second paging message includes additional information that facilitates positioning the mobile device in the wireless network, the additional information comprising an indicator indicating an early data transmission.

6. The apparatus of claim 5, wherein the information that facilitates positioning the mobile device in the wireless network further comprises at least one of: a request for location information, or a subset of assistance data for one or more cells.

7. An apparatus for wireless communication comprising a processor and a memory including processor executable code, wherein the processor executable code upon execution by the processor configures the processor to:
receive, from a wireless communication node, a paging message that includes information that facilitates positioning the mobile device in a wireless network, the information comprising an indicator indicating whether a change of assistance data for one or more cells has occurred, wherein the information that facilitates positioning the mobile device in the wireless network further comprises at least one of: a request for location information, a subset of assistance data for one or more cells, or an indicator indicating an early data transmission; and
reporting positioning measurements to a network node in response to the paging message.

8. The apparatus of claim 7, wherein the processor is configured to:
request assistance data for positioning the mobile device in the wireless network from the network node in case the indicator indicating a change of assistance data has occurred.

* * * * *

UNITED STATES PATENT AND TRADEMARK OFFICE
CERTIFICATE OF CORRECTION

PATENT NO. : 11,265,840 B2
APPLICATION NO. : 16/968552
DATED : March 1, 2022
INVENTOR(S) : Xu Liu et al.

It is certified that error appears in the above-identified patent and that said Letters Patent is hereby corrected as shown below:

In the Specification

In Column 5, Line 27, delete "embodiments," and insert -- embodiment, --, therefor.

In Column 7, Line 23, delete "implementation," and insert -- implementations, --, therefor.

In Column 9, Line 15, delete "request 814" and insert -- message 814 --, therefor.

In Column 9, Line 36, delete "enabled" and insert -- enable --, therefor.

In Column 10, Line 41, delete "enabled" and insert -- enable --, therefor.

In Column 11, Line 35, delete "Msg5 1022" and insert -- Msg5 1021 --, therefor.

In Column 13, Line 35, delete "more" and insert -- more of --, therefor.

Signed and Sealed this
Seventh Day of June, 2022

Katherine Kelly Vidal
*Director of the United States Patent and Trademark Office*